United States Patent [19]

Wheaton

[11] 4,282,020
[45] Aug. 4, 1981

[54] METHOD OF USING A WASTE GLASS COLLECTOR AND CULLET DUMPER

[75] Inventor: Frank H. Wheaton, Millville, N.J.

[73] Assignee: Wheaton Industries, Millville, N.J.

[21] Appl. No.: 854,669

[22] Filed: Nov. 25, 1977

[51] Int. Cl.³ .............................................. C03B 5/16
[52] U.S. Cl. ......................................... 65/28; 65/164; 65/165; 46/41
[58] Field of Search .................... 141/377; 65/165, 28, 65/164, 126, 129; 46/41, 42; 214/1 GD

[56] References Cited

U.S. PATENT DOCUMENTS 1,553,163  9/1925  Holyoke .................................... 46/41

*Primary Examiner*—Arthur D. Kellogg
*Attorney, Agent, or Firm*—Paul F. Prestia

[57] ABSTRACT

A receiver for waste molten glass, which automatically dumps the glass as cullet in lump or fragment form. The receiver comprises primarily a hopper or bin, with a central partition which divides the hopper into two compartments. The hopper or bin is pivotally mounted for reciprocating pivotal movement about a horizontal line in the plane of the partition such that the compartments formed on either side of the partition are alternately faced upwardly to receive molten glass and cooling water. Molten glass gobs, thus cooled, and water weight that side of the hopper in which they are received, thus causing it to pivot downwardly and thereby to dump cooled cullet in lump form while the alternative compartment is faced upwardly to receive subsequently poured waste molten glass and water until the weight of material in that compartment causes reverse pivotal movement and dumping. The hopper is triangular in vertical cross section, as are the partitioned compartments thereof.

2 Claims, 2 Drawing Figures

METHOD OF USING A WASTE GLASS COLLECTOR AND CULLET DUMPER

This invention pertains to an apparatus for receiving gobs of waste molten glass and for the conversion and dumping of same as reusable cullet lumps and fragments.

In the normal operation of a glass factory comprising numerous production machines, it sometimes becomes necessary for maintenance or other reasons to shut down one of the machines. In that case, molten glass flowing from a common furnace to all of the machines must continue to pass through the delivery system to the location of the inoperative machine. Various types of apparatus have been devised to receive the molten glass which thus continues to flow, even though that molten glass must be wasted, and to save that glass, preferably for reuse.

Commonly, the waste molten glass gobs are delivered downwardly through a chute to a receiving area below the floor of the glass factory. Water is simultaneously passed down the chute and the water and the molten glass gobs, together with additional water if necessary, are received in a large bin provided for that purpose. If the proper proportions of molten glass and water are maintained, the gobs of glass cool in lump form in the collection bin and periodically the bin is removed and dumped. However, continuous attention is required to ensure that the bins are dumped periodically and in a timely fashion to prevent the gobs of molten glass from accumulating into a large heavy mass, the top of which protrudes above the surface of the water in the bin. When that happens, instead of friable or fragmented lumps, the waste cullet takes the form of a single large mass which is much less practical to use.

There is a need for a simplified system or apparatus for receiving waste molten glass under these circumstances and for preserving or converting it for reuse.

It is the general object of the present invention to provide such an apparatus.

A more specific object of this invention is to provide a simple, low-energy consumption apparatus of this type which automatically dumps the cullet before it has had the opportunity to agglomerate into a single large mass.

These objects and others which will become apparent in the course of the subsequent description of this invention, are met, briefly, by a triangular pivotally mounted hopper divided into two triangular compartments by a central partition, all adapted to permit these separate compartments to be alternately positioned for receiving molten glass and accompanying cooling water for a period of time. The compartments comprise adjacent triangular receiving bins, each having a common closed side and an open side, the two sides intersecting one another. When the weight of material in one compartment causes pivotal rotation of the hopper and dumping of cooled glass therefrom, the remaining compartment is faced upwardly in position to receive a subsequent portion of waste molten glass and water. Then it too pivotally rotates the hopper, this time in the opposite direction, so that it is dumped and the first compartment is repositioned for receiving the next subsequent portion of glass and water. Mounting of the apparatus for reciprocating pivotal movement about a horizontal line in the plane of the centrally dividing partition permits the apparatus to rotate easily between its two extreme or limit positions with only minimal need for energy or maintenance in the course of its operation.

For a better understanding of this invention, reference may be made to the detailed description thereof which follows, taken in conjunction with the appended claims and the accompanying figures, in which:

Figure 1:
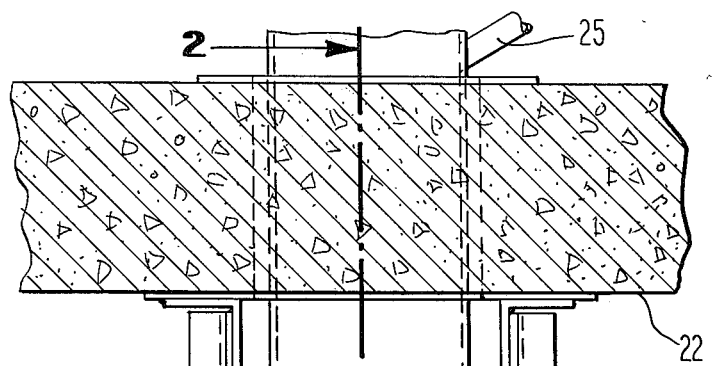
FIG. 1 is a side elevation view of the waste molten glass receiver and dumper of the present invention.
Figure 1:
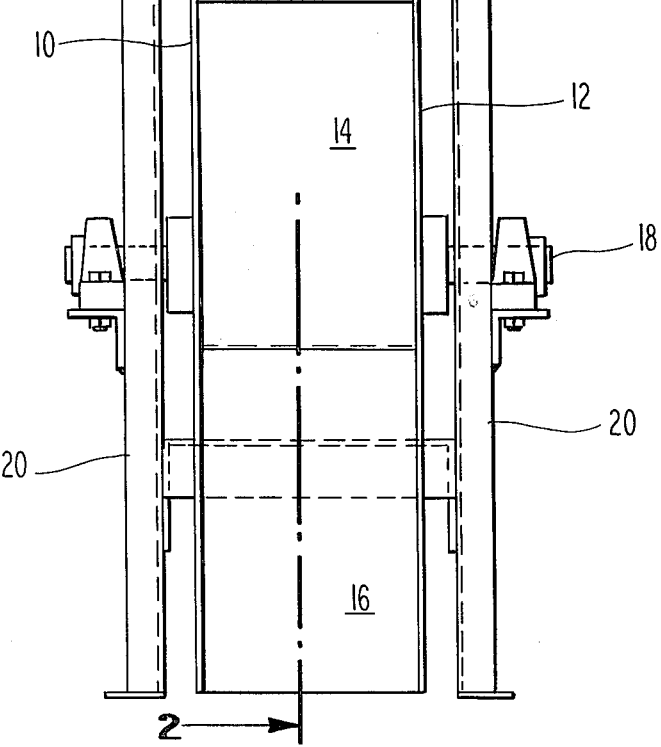
Figure 2:
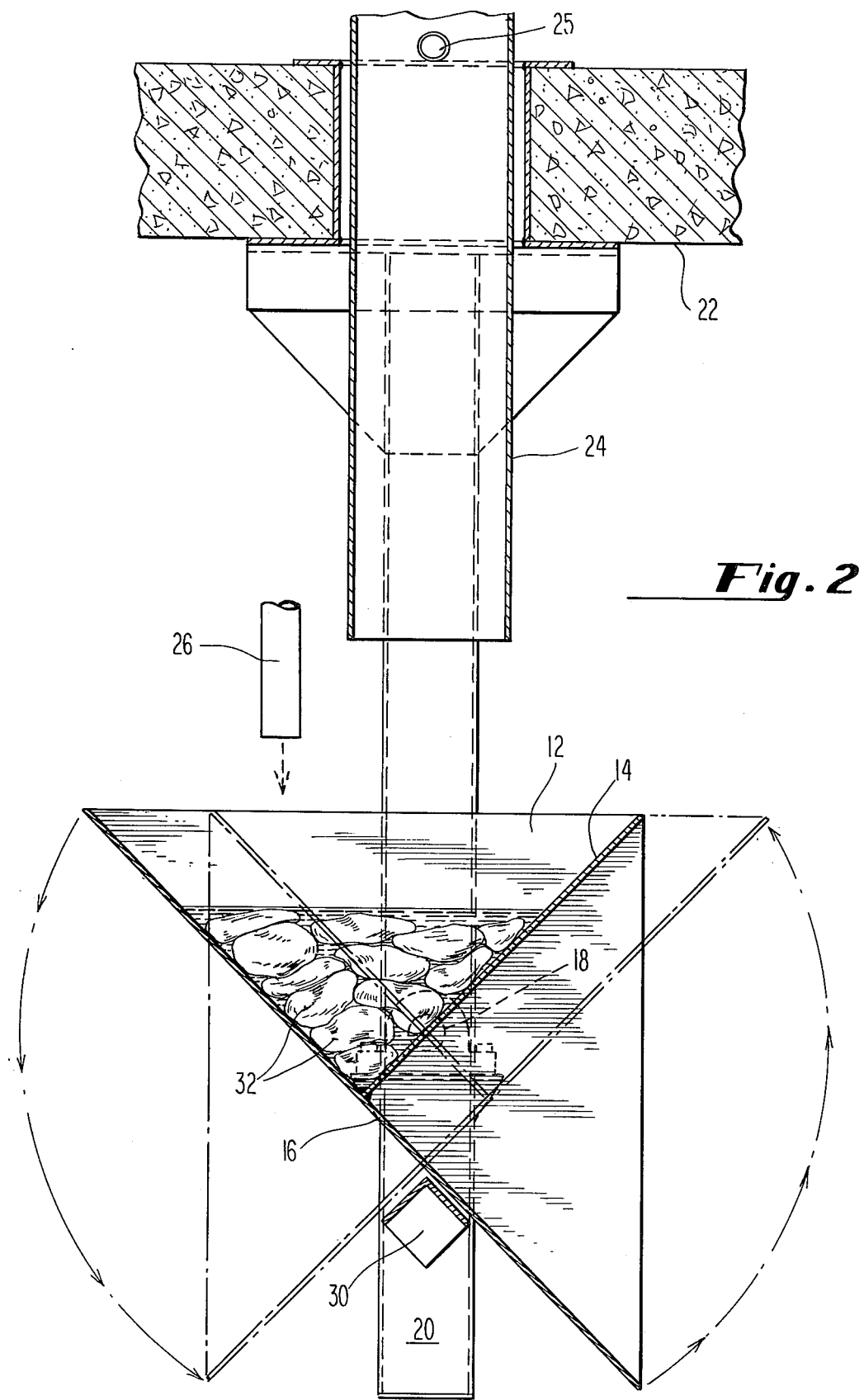
FIG. 2 is a sectional elevation view, in the plane 2—2, of the apparatus shown in FIG. 1.

Referring more specifically to the apparatus shown in FIGS. 1 and 2, there is seen a compartmented self-dumping waste molten glass receiver and cullet maker consisting of a pair of identical vertically oriented triangular sidewalls 10 and 12, the edges of which are parallel to one another, a central partition wall 14, which forms a common sidewall of adjacent triangular compartments or bins within the overall hopper of the apparatus. Further included is a common bottom wall 16.

In the preferred embodiment of the present invention, as shown, sidewalls 10 and 12 are right triangles and center or partition wall 14 intersects the hypotenuse of these right triangles at a center of symmetry of bottom wall 16 which connects sidewalls 10 and 12. Thus, the common sides of the adjacent bins each form 45° angles with their respective open sides and 90° angles with their respective remaining sides. All of the intersecting wall edges are, of course, welded or connected to one another.

Further, the apparatus thus formed and comprising adjacent triangular compartments or bins is mounted for reciprocating pivotal movement about a horizontal line located in the plane of central partition wall 14, such pivotal movement means in the preferred embodiment of the invention taking the form of pillow block bearings 18 in supporting stanchions 20. Stanchions 20 are in turn suspended from the ceiling 22 below a glass factory floor, through which a molten glass-water chute 24 projects. Cooling water inlet 25 is disposed to introduce water along with molten glass in the molten glass chute 24 and a separate water supply line 26 is provided for introducing additional cooling water directly into the upwardly facing compartment bins of the apparatus, as may be required.

In operation, the adjacent triangular compartments or bins are alternately faced upwardly by pivotal movement of the apparatus between extreme positions, at each of which one of the compartments is faced upwardly, the movement of the apparatus being limited by stop member 30.

As the molten glass gobs and water enter the upwardly facing compartment, it gradually fills with water and the molten glass gobs are quickly cooled by the water into friable lumps 32. When the weight of the glass and water in the bin causes pivotal movement of the bin downwardly into one of the limit positions of the bin, the cullet, thus formed in the bin, is dumped into a receiving tank from which it is later unloaded for subsequent reuse. As one of the compartments is thus unloaded, the other compartment is faced upwardly to receive the next subsequent portion of molten glass gobs and water.

By way of example, with adjacent triangular compartments which are 12 inches wide and 25½ inches long (along the bottom 16 and central partition 14 walls thereof), and with molten glass being introduced at a rate on the order of 100 gobs per minute, each of the gobs weighing on the order of 4.8 ounces, the pivotal movement of the apparatus, in one test, occurred about every 20 seconds with water being introduced along with the glass at a rate on the order of 20 gallons per minute. In various other tests with the same apparatus, the cycle time, during which one of the compartments is being filled and prior to dumping has been varied from 15 to about 65 seconds and the water flow has been varied from about 15 to 30 gallons per minute.

In practically all cases, the molten glass gobs are formed into friable lumps which flow freely out of the downwardly rotating compartments, although in some cases the lumps glow brightly for as long as 5 minutes.

The preferred material of construction for the partitioned hopper in the apparatus of this invention is 3/16ths inch steel plate.

As shown, the preferred form of the present invention is that in which each machine position below the floor level of a glass making factory is provided with a molten glass gob chute, and rotating cullet receiver and dumper, with ceiling mounted stanchions for the support thereof. However, in some circumstances, it may be a desirable alternative to provide the rotating bin cullet receiver of this invention on a portable stand which may be freely moved, such as by dollies or ceiling supported rollers, to different positions and thereby permit the use of such apparatus with a plurality of glass making machines, as might be required.

While this invention has been described with reference to a specific embodiment thereof, it should be understood that it is not limited thereto and the appended claims are intended to be construed to encompass all forms of the present invention which may be devised and used by those skilled in the art but which nevertheless fall within its true spirit and scope.

Having thus described my invention, I set forth that which I regard as my invention and claim:

1. Method for collecting molten waste glass cullet and dumping same in hardened lump form, said method comprising permitting said molten glass stream to fall into and simultaneously introducing water to one of a pair of adjacent pivotally mounted bins, said bins being adapted for reciprocal pivotal movement between alternative limit positions wherein one of said bins is upwardly facing to receive the molten glass or water and the other of said bins is in position to dump the contents thereof, said bins further being adapted to be pivoted to the alternative limit position by the weight of glass and water in the upwardly facing bin.

2. Method, as recited in claim 1, wherein said adjacent pivotally-mounted bins consist of triangular receiving bins, each of the two bins having a common closed side, and an open side, the two open sides intersecting one another, said bins being mounted for reciprocatory pivotal movement in unison about a line in the plane of their common side between two limit positions, one of the open sides of said bins facing upwardly at each of said limit positions.

* * * * *